April 12, 1960  H. G. ANDRÉ  2,932,680
BATTERY ELECTRODE AND METHOD OF MAKING SAME
Filed May 7, 1957  2 Sheets-Sheet 1
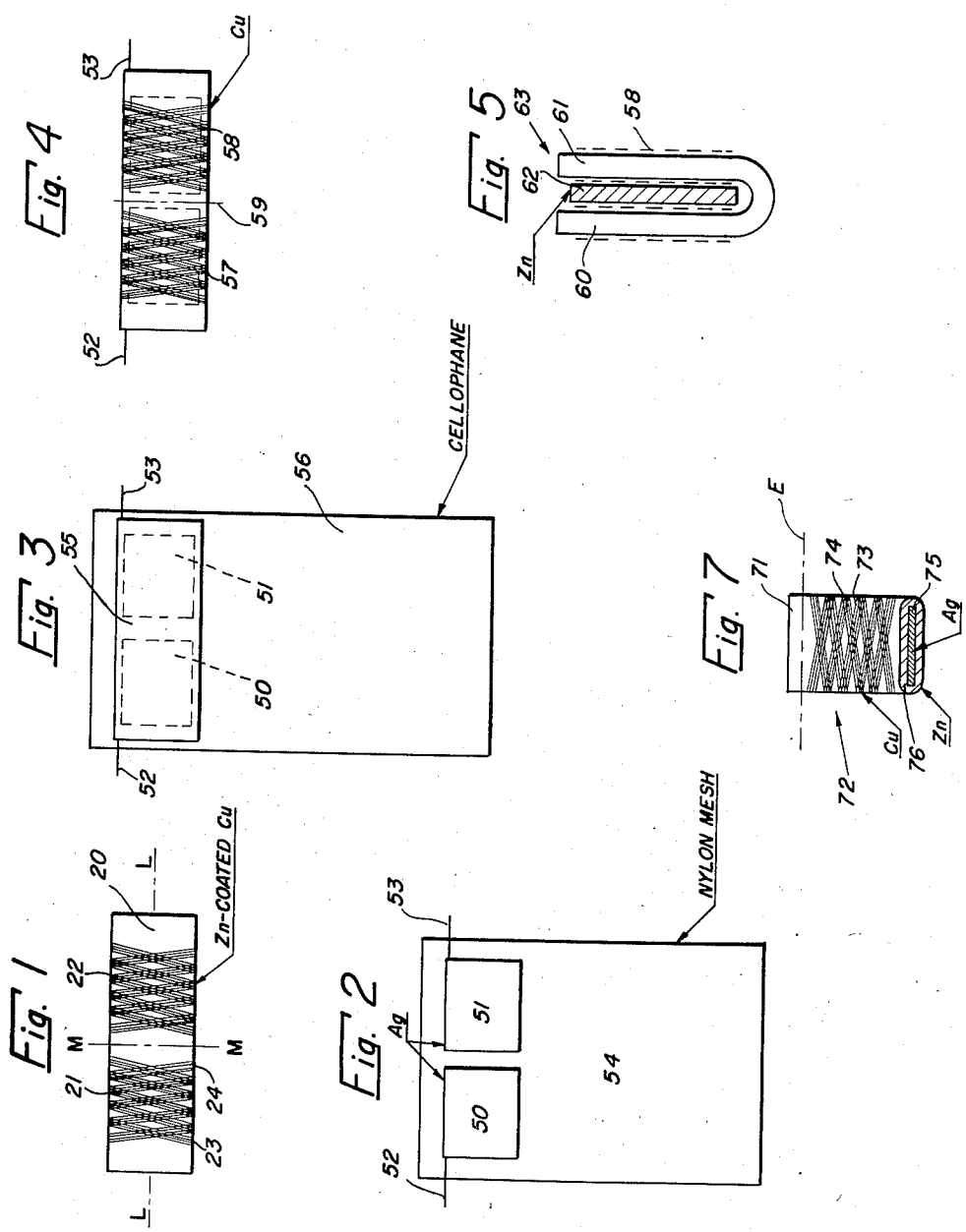
INVENTOR:
HENRI GEORGES ANDRÉ
BY
AGENT April 12, 1960

H. G. ANDRÉ

2,932,680

BATTERY ELECTRODE AND METHOD OF MAKING SAME

Filed May 7, 1957

INVENTOR.
HENRI GEORGES ANDRÉ

BY

AGENT

United States Patent Office 2,932,680
Patented Apr. 12, 1960

2,932,680

BATTERY ELECTRODE AND METHOD OF MAKING SAME

Henri Georges André, Montmorency, France, assignor to Yardney International Corp., New York, N.Y., a corporation of New York Application May 7, 1957, Serial No. 657,532

Claims priority, application France May 7, 1956

2 Claims. (Cl. 136—30)

This invention relates to electrodes for electrochemical batteries, especially electrodes whose active material (e.g. zinc in elemental and/or compound form) tends to dissolve into the electrolyte during cycling of the battery.

In my copending application Ser. No. 650,405, filed April 3, 1957, of which the present application is a continuation-in-part, I have disclosed an electrode of this character which includes zinc as an active material and a framework made from a material having a particular affinity for zinc, such as copper, the effective area of the framework being substantially in excess of the projected area of the electrode and amounting, preferably, to not less than 10 cm.$^2$ per gram of zinc. According to an embodiment of the invention described in that application, the framework is in the form of a wire coil.

Objects of my instant invention are to provide a more efficient method of forming an electrode of the character set forth above; to provide an improved framework structure for such electrode; and to provide a novel electrode assembly for the cells of electrochemical batteries wherein electrodes of different polarities are joined together into a single physical unit before being introduced into the battery casing whereby assembly is facilitated and mechanical stability of each cell system is improved.

In accordance with a feature of this invention, I juxtapose a body of active material (e.g. zinc) with a framework of a collector material (e.g. copper) having a high affinity for the active material to form an electrode, the proportioning of the two components being preferably selected in conformity with the relationships indicated above. In an advantageous embodiment, the framework may be constituted by a wire coil; the body of active material may be part of a supporting core or mandrel upon which the wire is wound or may take the form of a second wire, or set of wires, wound around the core alongside the wire or wires of collector material. Upon prolonged operation of the battery, the active material (or a substantial part of it) is collected by the framework and remains deposited thereon or is promptly redeposited on it in a cathodic phase of a cycle after having been dissolved in the electrolyte during a cycle phase in which the electrode functioned as an anode.

According to another feature of this invention, the wire coil is helically wound on its core in a plurality of layers of opposite pitch whereby a large number of interstices are formed between turns to furnish the desired large effective surface area. The core may, in accordance with a further feature of the invention, be constituted by one or more electrodes of the opposite polarity preferably wrapped in the usual sheet material serving as an interelectrode separator; thus, the separator may include one or more layers of cellophane, polyvinyl alcohol or combinations thereof with each other and/or with porous paper, nylon mesh, glass-wool felt and the like.

The above and other objects, features and advantages of the invention will become more fully apparent from the following detailed description, reference being had to the accompanying drawing in which:

Fig. 1 is an elevational view of an electrode embodying the invention;

Fig. 2 shows a first stage in the preparation of an electrode assembly according to the invention;

Figs. 3, 4 and 5 show subsequent stages in the preparation of such electrode assembly;

Fig. 7 is a cross-sectional view of a modified electrode of the general type illustrated in Fig. 1.

Figure 6:
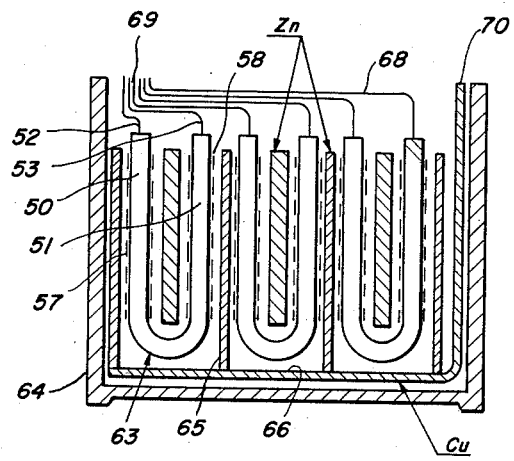
Fig. 6 is a sectional view of a battery with a plurality of cells each incorporating an electrode assembly made by the process of Figs. 2–5.

In Fig. 1 I have shown a flat, plate-like core 20 upon which two wire coils 21, 22 are wound with spaced-apart turns. Each coil may consist of fine copper wire, e.g. of 0.05 mm. diameter, wound in a plurality of layers 23, 24 of opposite pitch symmetrical about the longitudinal axis L—L. As indicated in the drawing, the wire is zinc-coated in the manner shown in Figs. 1 and 2 of my above-identified copending application. If the core 20 is not required as a support for the wire coils once the electrode has been introduced into a battery casing, as where this electrode is of small dimensions, it may consist of any material of suitable mechanical strength and may be withdrawn before assembly of the electrode into a cell. The core may, however, also consist in whole or in part of zinc to serve as the initial source of the active material which is first dissolved by the electrolyte (e.g. a concentrated solution of potassium hydroxide) and then plated out onto the collector coils 21, 22, in the manner described above, and in such case may be a solid or perforated plate of zinc or of an inert conductive or non-conductive plate member coated with zinc, as illustrated in Fig. 7. It will also be evident that the core or mandrel 20 may initially be of cylindrical form and may have been flattened, before introduction into a battery, after the wire coils have been formed thereon. Prior to assembly into a battery, the unit of Fig. 1 is preferably folded about its median line M—M to form an electrode pair.

Figs. 2–5 illustrate the formation of an electrode assembly according to the invention incorporating a pair of wire coils, similar to those of Fig. 1, as a framework for the negative electrode material. In this assembly a pair of positive electrodes 50 and 51, e.g. in the form of oxidized plates of sintered silver having conductors 52 and 53 projecting therefrom, are first wrapped in one or more layers 54 of nylon mesh to form a sleeve 55, the latter being then wrapped a number of times in a sheet 56 of cellophane. Coils 57, 58 of copper wire are then wound around the resulting electrode package, as shown in Fig. 4, whereupon the unit is folded about its median line 59 to form the U-shaped assembly 63 of Fig. 5; between the arms 60, 61 of the U a zinc sheet 62 may be disposed to serve as a source of active material to be deposited upon the turns of the wire coils 57, 58. It will be apparent that the wire also forms a retaining means for the wrapper 55, 56.

Fig. 6 shows an electrochemical battery comprising a plurality of cells, each including an electrode assembly 63 as shown in Fig. 5, within a casing 64. The electrode assemblies 63 are separated from one another by further zinc sheets 65. The several sheets 65 are interconnected by a plate 66, preferably of copper, leading toward the negative terminal 70. It will be noted that the inner zinc sheets 62 are also conductively connected, through the intermediary of copper coils 57 and 58, with the terminal plate 66 so that the use of separate conductors for these sheets becomes unnecessary; this connection is firmly assured by the swelling of the separator material, following introduction of the alkaline electrolyte into the casing 64, which eliminates the separations between the elements of the electrode assemblies shown in the drawing. The positive terminal 69 is connected to the corresponding electrodes 50, 51 by leads 68 forming extensions of the conductors 52, 53.

Fig. 7 illustrates a modified electrode 72 which is generally similar to the electrode of Fig. 1 and comprises, as a support for its wire coils, a core 71 in the form of a plate 75 having a zinc coating 76. The plate 75, which may be of silver as indicated, is insoluble in the electrolyte and assures the mechanical stability of the copper framework even after most or all of the coating 76 has been removed and redeposited on this framework. The pitch of the wire turns 73, 74 varies over the height of the electrode so as to provide an increasingly larger ratio of effective to projected surface area toward the lower edge of the electrode where the concentration of the dissolved zinc in the electrolyte is generally greater than at the top. The coils 73, 74 may terminate below the electrolyte level indicated at E in Fig. 7.

Figure 8:
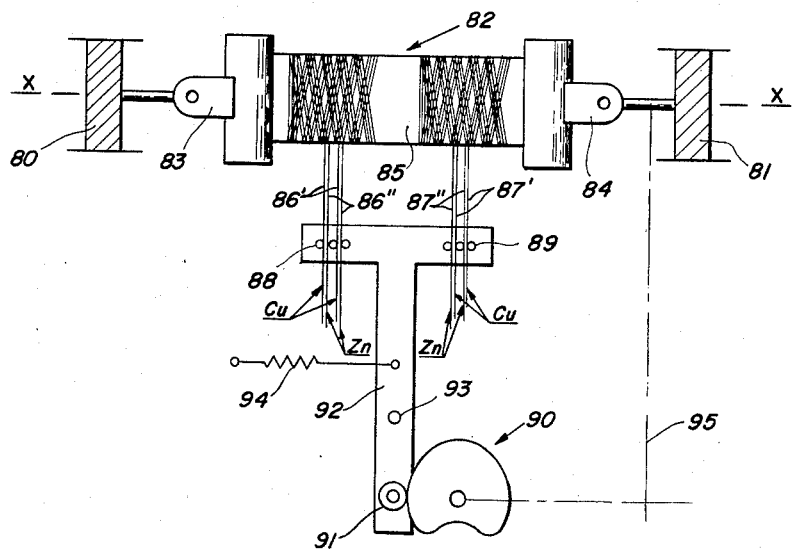
Fig. 8 is a diagrammatic view of an apparatus of winding a wire coil on a core to form an electrode framework as shown in Fig. 1, 4 or 7.

Fig. 8 shows schematically an apparatus for producing the wire framework of the electrodes illustrated in the preceding figures. It comprises a pair of bearings 80, 81 within which there is rotatably journaled a spindle 82 comprising two chucks 83, 84; the latter may be in the form of conventional, resilient paper clamps. The mandrel 85, which may be a simple core as shown in Figs. 1 and 7 or an electrode wrapper as illustrated in Figs. 2–5, is clamped in these chucks for rotation about its axis X—X, this rotation being synchronized with the movement of a rotatable cam 90 acting through a cam follower 91 upon a wire guide 92 pivoted at 93. The wire guide 92, which is urged by a spring 94 against cam follower 91, carries pins 88 and 89 to control the axial displacement of wires 86', 86" and 87', 87" in forming the layers of opposite pitch on the mandrel 85. Wires 86' and 87' may consist of copper, as indicated, and may have been flattened and/or pre-hardened by a preliminary wire-drawing step; wires 86" and 87" may consist of zinc, as likewise indicated, to constitute a source of active material designed to coat the copper wires. A suitable shaping of cam 90 will produce any desired uniform or non-uniform pitch, e.g. as described in connection with Fig. 7, and will serve for the accurate control of the ratio of effective surface area to projected area. The coupling between spindle 82 and cam 90, indicated schematically at 95, is preferably such that a revolution of the cam will not correspond to an integral number of spindle revolutions whereby corresponding turns of alternate layers of wire will be axially staggered, as likewise apparent from the drawing. The total mass of zinc initially available should be several times (e.g. from three to ten times) as large as the mass of the copper framework.

Modifications of the arrangements specifically described and adaptations of the herein disclosed principles to other uses will be readily apparent to persons skilled in art and are intended to be embraced in the scope of the invention as defined in the appended claims. Thus it may be mentioned, by way of example, that a copper-zinc alloy (preferably with the copper predominating) may be substituted for pure copper in the wire coils forming the framework of the electrodes shown in the drawing.

I claim:

1. An electrode for electrochemical batteries, comprising a member containing zinc and a conductive framework juxtaposed in direct contact with said zinc, said framework containing at least a major proportion of copper and being in the form of wire wound around said member, said member being in the form of a flat plate containing a central supporting element of silver, the zinc forming a coating on said element.

2. An electrochemical battery comprising a positive and a negative terminal, a plurality of cells each including a U-shaped wrapper having a positive electrode plate inserted in each arm of the U, each cell further including an elongated conductor element wound around each of said arms, a plurality of negative electrode plates inserted between the arms of each U and between adjacent wrappers in contact with said conductor element thereon, said negative plates containing zinc as an active material, said element consisting of a collector material containing copper, a connector member in conductive contact with the negative plates inserted between said adjacent wrappers and extending to said negative terminal, and conductor means extending from said positive plates to said positive terminal.

References Cited in the file of this patent

UNITED STATES PATENTS

| | | |
|---|---|---|
| 485,013 | Main | Oct. 25, 1892 |
| 512,473 | Irving | Jan. 9, 1894 |
| 600,693 | Julien | Mar. 15, 1898 |
| 719,872 | Reed | Feb. 3, 1903 |
| 745,588 | Ford | Dec. 1, 1903 |
| 1,021,989 | Morrison | Apr. 2, 1912 |
| 1,533,568 | Pouchain | Apr. 14, 1925 |
| 1,895,397 | Pouchain | Jan. 24, 1933 |

FOREIGN PATENTS

| | | |
|---|---|---|
| 24,516 | Great Britain | of 1895 |
| 228,802 | Great Britain | Feb. 12, 1925 |